(12) United States Patent
Axelsson et al.

(10) Patent No.: US 9,221,311 B2
(45) Date of Patent: Dec. 29, 2015

(54) LINKAGE ARRANGEMENT

(75) Inventors: Mats Axelsson, Huskvarna (SE); Robin Hansson, Huskvarna (SE)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 13/984,083

(22) PCT Filed: Feb. 7, 2011

(86) PCT No.: PCT/SE2011/050137
§ 371 (c)(1),
(2), (4) Date: Aug. 7, 2013

(87) PCT Pub. No.: WO2012/108797
PCT Pub. Date: Aug. 16, 2012

(65) Prior Publication Data
US 2013/0307249 A1  Nov. 21, 2013

(51) Int. Cl.
*B60D 1/14* (2006.01)
*B62D 53/02* (2006.01)

(52) U.S. Cl.
CPC .............. *B60D 1/14* (2013.01); *B62D 53/023* (2013.01)

(58) Field of Classification Search
USPC ........................................................ 280/504
See application file for complete search history.

(56) References Cited

U.S. PATENT DOCUMENTS 2,309,204 A * 1/1943 Nelson ..................... 280/476.1
3,557,892 A   1/1971 Burrough
3,669,469 A   6/1972 Hartelius
3,912,300 A  10/1975 Bryan, Jr.
4,403,670 A   9/1983 Sammarco
8,006,796 B1 * 8/2011 Fontaine ..................... 180/235
2008/0264026 A1* 10/2008 Ishii et al. .................... 56/10.8

FOREIGN PATENT DOCUMENTS

DE   2547669 A1   4/1977
EP    111134 A2   6/2001
(Continued)

OTHER PUBLICATIONS

International Search Report and Written Opinion of PCT/SE2011/050137 mailed Oct. 5, 2011.
(Continued)

*Primary Examiner* — Joseph Rocca
*Assistant Examiner* — Felicia L Brittman
(74) *Attorney, Agent, or Firm* — Nelson Mullins Riley & Scarborough LLP

(57) ABSTRACT

A linkage arrangement for an articulated vehicle. The linkage arrangement (1) comprises a front frame (50) of the articulated vehicle, a rear frame (60) of the articulated vehicle, and a first pivot joint (10) interconnecting the front frame (50) and the rear frame (60) such that the front frame (50) and the rear frame (60) are pivotable relative each other about the first pivot joint (10). The linkage arrangement also comprises a link (40) having a fixed length. The link has a front end (41) pivotably connected to the front frame (50) by means of a second pivot joint (20), and a rear end (42) pivotably connected to the rear frame (60) by means of a third pivot joint (30). A projection of the first pivot joint (10) on the link (40) is positioned between the second (20) and third (30) pivot joints, at a first distance (D12) from the second (20) pivot joint and at a second distance (D13) from the third pivot joint (30).

20 Claims, 4 Drawing Sheets

(56) References Cited

FOREIGN PATENT DOCUMENTS

| | | | |
|---|---|---|---|
| EP | 1111134 | A2 * | 6/2001 |
| FR | 2534442 | A1 | 4/1984 |

OTHER PUBLICATIONS

Chapter I International Preliminary Report on Patentability of PCT/SE2011/050137 mailed Aug. 13, 2013.

* cited by examiner

LINKAGE ARRANGEMENT

TECHNICAL FIELD

This disclosure relates to linkage arrangements and in particular to linkage arrangements arranged for interconnecting forward and rearward units of articulated vehicles.

BACKGROUND OF THE INVENTION

Vehicles of the type known as articulated vehicles or articulated frame vehicles are well known. Such vehicles typically comprise forward and rearward units interconnected by an articulated joint.

A commonly used arrangement for connecting the front and rearward units of an articulated vehicle comprises two spherical bearings arranged on the same vertical line and a third spherical bearing on a horizontal distance away from the other spherical bearings but on same vertical level as one of the first two. U.S. Pat. No. 3,912,300 discloses a linkage arrangement of that kind.

When using an articulated joint as described above, certain maneuvers might lead to undesired instability of the vehicle.

Accordingly, there is a need for an improved joint arrangement for an articulated vehicle, which arrangement provides improved stability of the vehicle.

SUMMARY OF THE INVENTION

In view of the aforementioned respects of known articulated vehicles, an object of the invention is to create an improved and/or alternative solution for articulated vehicles that may alleviate at least some of the mentioned drawbacks with present articulated vehicles.

The object is wholly or partially achieved by a linkage arrangement for an articulated vehicle and an articulated vehicle according to the respective appended independent claims. Embodiments are set forth in the appended dependent claims, in the following description and in the drawings.

According to a first aspect of the invention, there is provided a linkage arrangement for an articulated vehicle. The linkage arrangement comprises a front frame of the articulated vehicle and a rear frame of the articulated vehicle. The arrangement also comprises a first pivot joint interconnecting the front frame and the rear frame such that the front frame and the rear frame are pivotable relative each other about the first pivot joint. Furthermore the linkage arrangement comprises a link having a fixed length. The link has a front end pivotably connected to the front frame by means of a second pivot joint, and a rear end pivotably connected to the rear frame by means of a third pivot joint. A projection of the first pivot joint on the link is positioned between the second and third pivot joints, at a first distance from the second pivot joint and at a second distance from the third pivot joint. Thereby an enhanced stability of the vehicle is achieved.

According to an embodiment the pivot joints are configured so as to allow pivoting in directions which extend in separate planes. Thereby, the articulated joint becomes flexible and adaptable to different situations.

According to an embodiment, at least one of the pivot joints is a spherical bearing.

According to another embodiment, at least one of the pivot joints is a ball joint.

According to another embodiment the first distance and the second distance are essentially equal when a longitudinal axis of the front frame is parallel to a longitudinal axis of the rear frame.

According to yet another embodiment the a front frame has a first wheel axle and the rear frame has a second wheel axle, and a third distance between the first pivot joint and the first wheel axle differs from a fourth distance between the first pivot joint and the second wheel axle when a longitudinal axis of the front frame is parallel to a longitudinal axis of the rear frame. Thereby, the minimum turning radius of the vehicle comprising the articulated joint might decrease compared to vehicles in which the third distance and the fourth distance are essentially equal.

According to yet another embodiment, the fourth distance is smaller than the third distance.

According to yet another embodiment, the ratio between the third distance and the fourth distance is about 3 (three).

According to yet another embodiment the rear frame and the front frame are parts of an articulated lawn mower.

According to a second aspect of the invention, there is provided an articulated lawn mower comprising an articulated joint according to the first aspect of the invention. Since articulated lawn mowers are often working on inclined and irregular surfaces, the enhanced stability provided by the articulated joint according to the present invention is particularly favorable for them.

DEFINITIONS

As used herein the following terms have the following meanings:

The X-, Y- and Z-directions are defined based on a horizontal surface on which the articulated vehicle may be supported.

The "horizontal plane" refers to the plane in which the horizontal surface extends, and is defined by the X and Y directions.

The "longitudinal direction" is the Y-direction, as best shown in FIG. 2.

The "lateral direction" is the X-direction, as best shown in FIGS. 3a and 3b.

The "vertical direction" is defined by the Z-axis (as shown in FIG. 2), and is orthogonal the horizontal plane.

The "neutral position" of the vehicle refers to a position in which the front and rear frames 30 of the vehicle are connected such that their longitudinal axes are substantially parallel to each other and to the Y-direction.

BRIEF DESCRIPTION OF THE DRAWINGS

The invention will be understood and appreciated more fully from the following detailed description, taken in conjunction with the drawings, in which.

DESCRIPTION OF PREFERRED EMBODIMENTS

Figure 1:
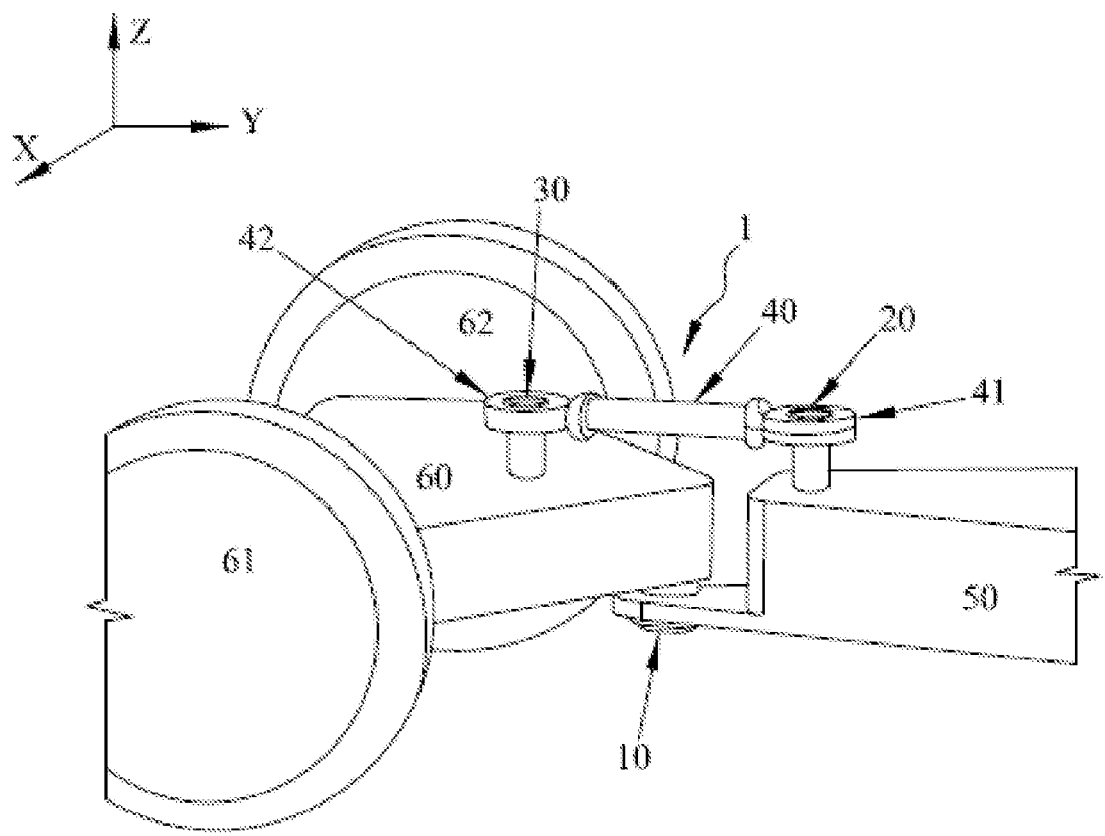
FIG. 1 is a schematic perspective view of linkage arrangement in accordance with the current disclosure.
Figure 2:
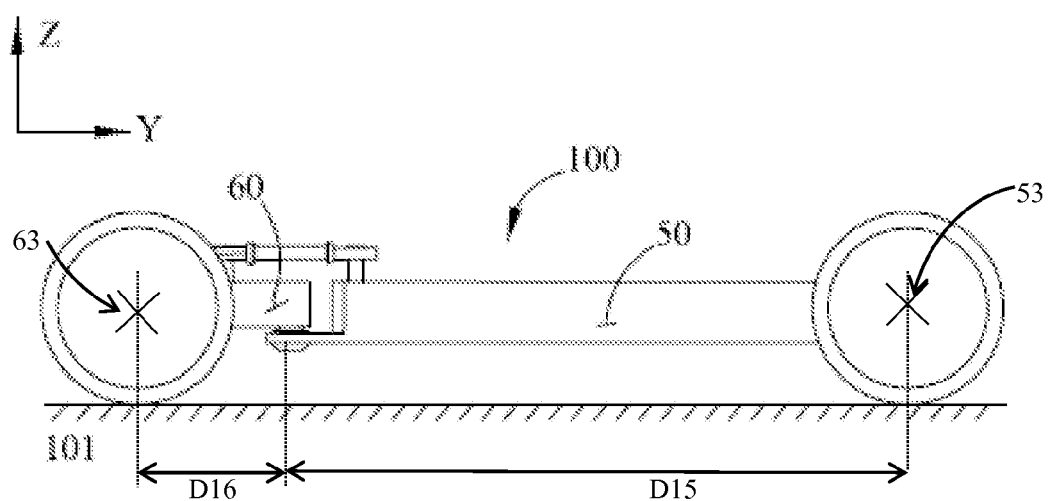
FIG. 2 is a schematic side view of a front frame and a rear frame of an articulated vehicle comprising the linkage arrangement of FIG. 1.

The present invention will be described more fully hereinafter with reference to the accompanying drawings, in which preferred embodiments of the invention are shown. The invention may, however, be embodied in many different forms and should not be construed as limited to the embodiments set forth herein; rather these embodiments are provided so that this disclosure will be thorough and complete, and will fully convey the scope of the invention to those skilled in the art. In the drawings, like numbers refer to like elements.

FIG. 1 shows a linkage arrangement 1 according to an embodiment of the present invention. The linkage arrangement 1 connects a rear frame 60 of an articulated vehicle 100 to a front frame 50 of the articulated vehicle 100.

The articulated vehicle 100 may be any suitable vehicle or machine, such as an articulated lawn mower or an articulated wheel loader. In the embodiment disclosed herein, the articulated vehicle is an articulated ride-on lawn mower.

The front frame 50 and the rear frame 60 may be supported by wheels 51, 52, 61, 62, as shown in the figures.

The linkage arrangement 1 comprises three pivot joints 10, 20, 30. According to an embodiment of the invention, the joints are implemented as spherical bearings 10, 20, 30. One or several of the joints 10, 20, 30 may alternatively be implemented as other types of joints allowing pivoting in several directions. Examples of such bearings are ball joint rod end bearings and radial spherical plain bearings.

A first pivot joint 10 interconnects the rear frame 60 and the front frame 50.

A second pivot joint 20 interconnects the front frame 50 and a link member 40, which has a fixed length. The link member 40 may be a rod 40, having a first end 41 and a second end 42. The first end 41 of the link 40 is connected to the front frame 50 by means of the second pivot joint 20. The second end 42 of the link 40 is connected to the rear frame 60 by means of a third pivot joint 30. The fixed length of the link member 40 implies that the second 20 and third 30 pivot joints are positioned at a fixed distance D1 from each other.

Figure 4:
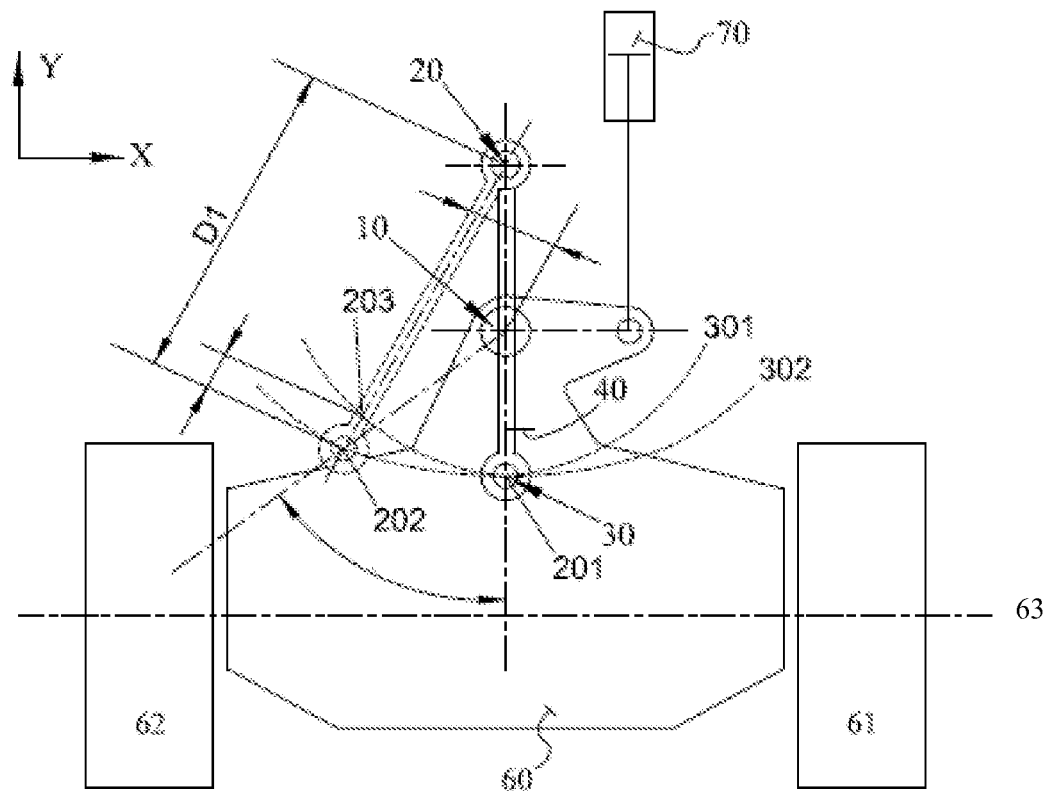
FIG. 4 is a schematic top plan view of the linkage arrangement of FIG. 1.

When the articulated vehicle is in a neutral position, the second 20 and third 30 pivot joints may be positioned at substantially the same level in the vertical direction. The link 40 between the two pivot joints 20, 30 may then extend in a direction that is essentially parallel to the Y-direction. In FIG. 4 the position of the link when the vehicle is in the neutral position is shown with solid lines. In the neutral position, the extension direction of the link may also coincide with the longitudinal axis L50 of the front frame, as well as with the longitudinal axis L60 of the rear frame 60.

The first pivot joint 10 is positioned closer to the supporting surface 101 than the other two pivot joints 20, 30.

When the articulated vehicle is in the neutral position, the three pivot joints 10, 20, 30 may lie in a plane that is essentially parallel to the YZ-plane.

Figure 5:
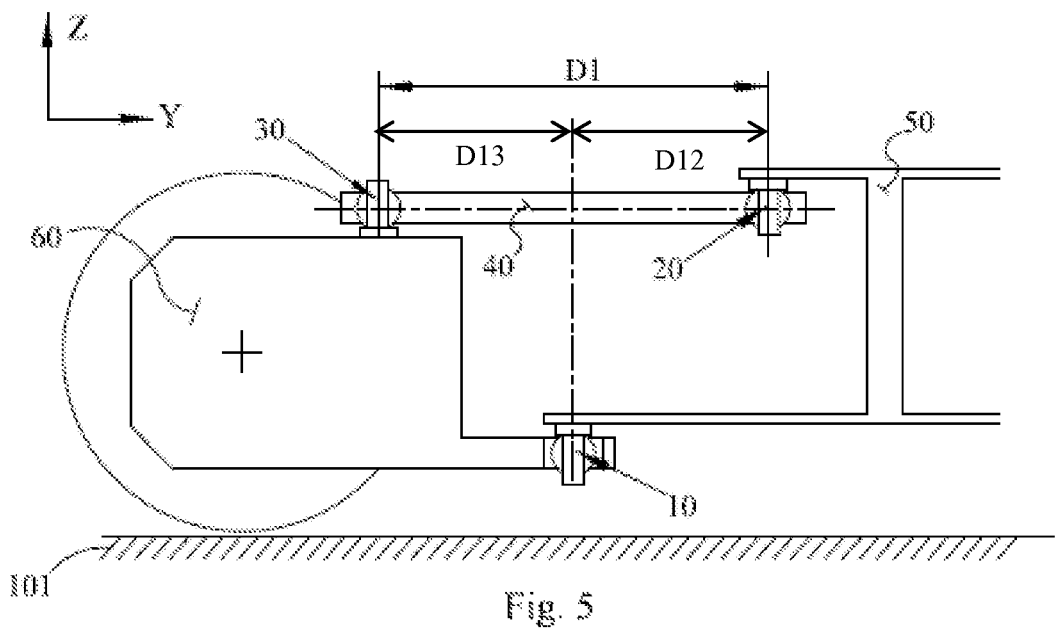
FIG. 5 is a schematic side view of the articulated joint of FIG. 1, in a first, neutral position.

The orthogonal projection of the first pivot joint 10 on a line intersecting the second and third pivot joints is positioned between the second pivot joint 20 and the third pivot joint 30, as shown e.g. in FIG. 5. In prior art arrangements of the type comprising three pivot joints, the orthogonal projection of a lower pivot joint on a line defined by the other two pivot joints would coincide with one of the other two pivot joints. In the embodiment shown in FIG. 5, the orthogonal projection of the first pivot joint is positioned at a first distance D12 from the second pivot joint 20 and at a second distance D13 from the third pivot joint 30.

The first pivot joint 10 defines the main steering point of the vehicle. As shown in FIG. 4, a steering cylinder 70 connected to the front frame (not shown in FIG. 4) controls the position of the rear frame 60 relative to the front frame 50 around the first pivot joint 10.

If the front frame 50 and rear frame 60 would not have been connected to each other by means of the fixed length link, it would have been possible for the a front frame 50 and the rear frame 60 to pivot relative each other about a vertical axis intersecting the first pivot joint 10.

In that case, a turning movement of the rear frame 60 relative to the front frame 50 could 15 involve a movement of the third pivot joint 30 along a first curve 301 from a first point 201 to a second point 203, in the XY-plane, as shown in FIG. 4. Then, the first pivot joint 10 could remain in a fixed position relative to the front frame 50.

However, since the third pivot joint 30 is not only connected to the first pivot joint 10, but also to the second pivot joint 20 by means of the link member 40, and since the distance D1 between the second 20 and third 30 pivot joints is fixed due to the link member 40, such a movement of the second pivot joint in the XY-plane only is not possible.

Figure 6:
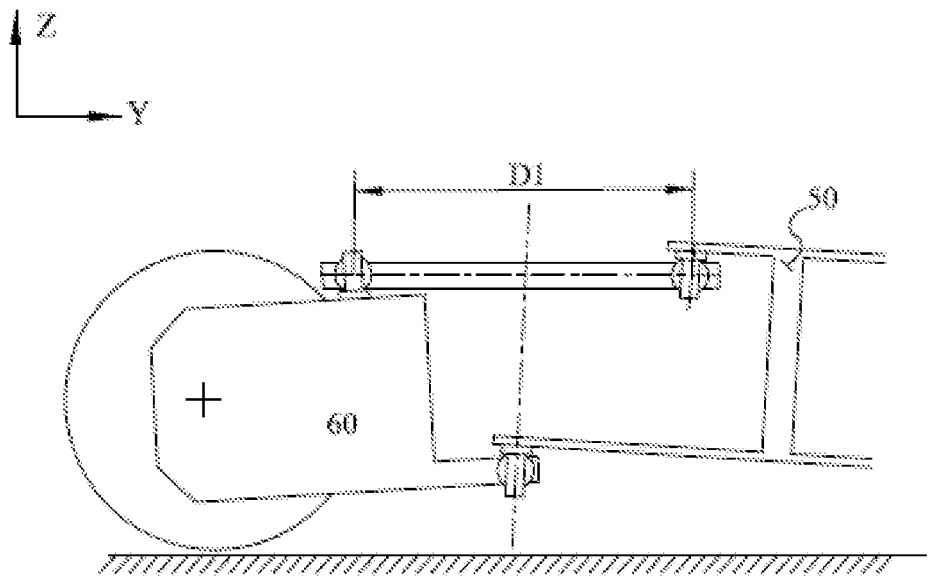
FIG. 6 is a schematic side view of the articulated joint of FIG. 1 in a second, articulated position.
Figure 7:
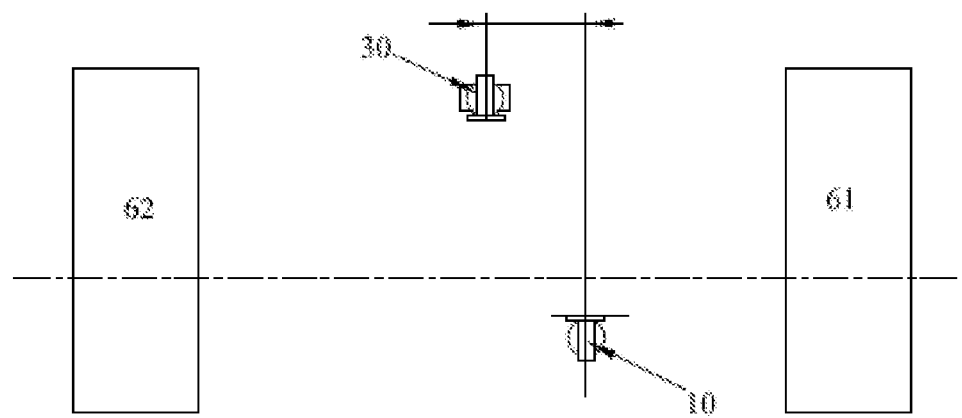
FIG. 7 is a schematic rear view of the articulated joint of FIG. 5, in an articulated position.

If the third pivot joint 30 would not have been connected to the first pivot joint 10, but to the second pivot joint 20 only, by means of the fixed length link member 40, a turning of the rear frame 60, and thereby the third pivot joint 30 relative to the front frame 50 and the second pivot joint 20 could imply a movement of the third pivot joint 30 along a second curve 302 in the XY-plane, from the first point 201 to a third point 202. Since the first 301 and the second 302 curves are not identical, the first pivot joint 10 is forced to leave its original position 201 during turning of the rear frame 60, relative to the front frame 50. As best shown in FIGS. 6 and 7, the pivot joint 10 might be forced to move in a lateral direction as well as in the vertical direction.

FIG. 7 is a rear view of the rear frame 60 and the first 10 and third 30 pivot joints, when the rear frame 60 is in an articulated position relative to the front frame 50.

In a neutral position, there will be no distance in the XY-plane between pivot joint 10 and the link member 40. As can be seen in FIGS. 4, and 7, there is a distance in the XY-plane between pivot joint 10 and the link member 40 when the vehicle is in an articulated position.

The above described configuration of the articulated link arrangement 1, implies that the pressure on the wheels 51, 52, 61, 62, is more evenly distributed when the vehicle is articulated than if a configuration as the one described in U.S. Pat. No. 3,912,300 would have been 10 used. Accordingly, an enhanced stability of the articulated vehicle is achieved.

According to an embodiment of the invention, the linkage arrangement 1 is configured such that the projection of the first pivot joint 10 on the link 40 is positioned at essentially equal distances D12, D13 from the second 20 and third 30 pivot joints, when the vehicle is in a neutral position. Other configurations are also possible.

Figure 3A:
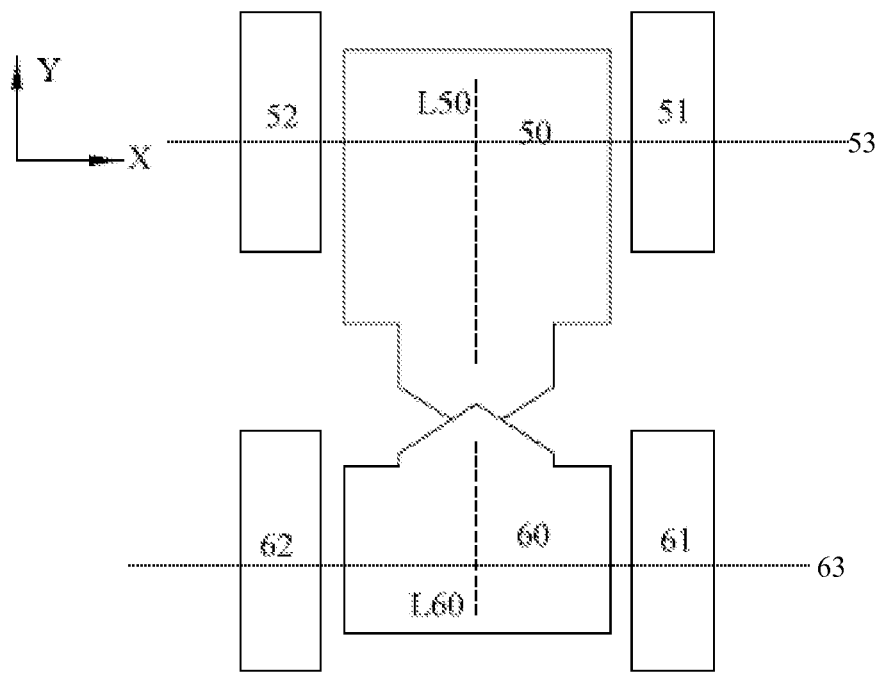
FIG. 3a is a schematic top plan view of an articulated vehicle in a neutral position.
Figure 3B:
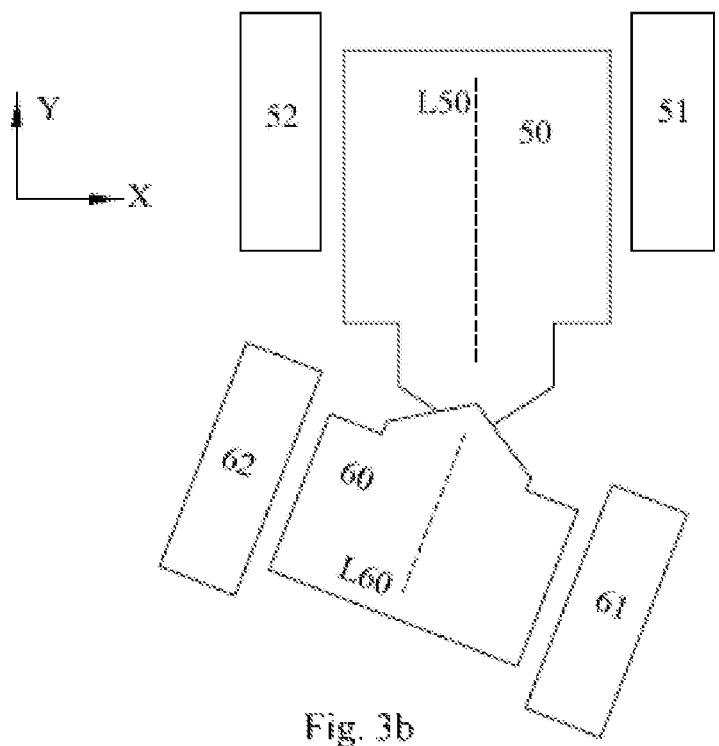
FIG. 3b is a schematic top plan view of an articulated vehicle in an articulated position.

As shown in FIG. 3a, the front frame 50 of the articulated vehicle 100 can have a first wheel axle 53 and the rear frame can have a second wheel axle 63. When the articulated vehicle 100 is in a neutral position, there is a third distance D15 in the longitudinal 20 direction between the first pivot joint 10 and the first wheel axle 53 and a fourth distance D16 in the longitudinal direction between the first pivot joint 10 and the second wheel axle 63. According to an embodiment, the third distance D15 s larger than the fourth distance D16.

According to an embodiment, the ratio between the third distance D15 and the fourth distance is about 3.

In the drawings and specification, there have been disclosed preferred embodiments and examples of the invention and, although specific terms are employed, they are used in a generic and descriptive sense only and not for the purpose of limitation, the scope of the invention being set forth in the following claims.

The invention claimed:

1. A linkage arrangement for an articulated vehicle, the linkage arrangement comprising
a front frame of the articulated vehicle;
a rear frame of the articulated vehicle;
a first pivot joint interconnecting the front frame and the rear frame such that the front frame and the rear frame are pivotable relative each other about the first pivot joint;
a link having a fixed length;
wherein the link has a front end pivotably connected to the front frame by means of a second pivot joint, and a rear end pivotably connected to the rear frame by means of a third pivot joint;
wherein a projection of a vertical axis of the first pivot joint on the link in a neutral position is positioned between the second and third pivot joints, at a first distance from the second pivot joint and at a second distance from the third pivot joint;
wherein the first pivot joint is configured to enable movement in a lateral direction and a vertical direction responsive to pivoting of the rear frame relative to the front frame out of the neutral postion;
wherein a pivot rod of the second pivot joint extends vertically in a first direction and a pivot rod of the third pivot joint extends vertically in a second direction which is opposite the first direction,
wherein the front frame has a first longitudinal axis and the rear frame has a second longitudinal axis;
wherein the front frame has a first wheel axle and the rear frame has a second wheel axle, and wherein a third distance between the first pivot joint and the first wheel axle differs from a fourth distance between the first pivot joint and the second wheel axle when the first longitudinal axis is parallel to the second longitudinal axis; and
wherein the third pivot joint is positioned between the first pivot joint and the second wheel axle.

2. The linkage arrangement according to claim 1, wherein the pivot joints are configured so as to allow pivoting in directions which extend in separate planes.

3. The linkage arrangement according to claim 1, wherein at least one of the pivot joints is a spherical bearing.

4. The linkage arrangement according to claim 1, wherein at least one of the pivot joints is a ball joint.

5. The linkage arrangement according to claim 1, wherein the first distance, and the second distance are equal when the first longitudinal axis is parallel to the second longitudinal axis.

6. The linkage arrangement according to claim 1, wherein the fourth distance is smaller than the third distance.

7. The linkage arrangement according to claim 1, wherein the ratio between the third distance and the fourth distance is 3 (three).

8. The linkage arrangement of claim 1, wherein the rear frame and the front frame are parts of an articulated lawn mower.

9. The linkage arrangement according to claim 1, wherein the first pivot joint is configured to move both laterally away from a first vertical plane in which a longitudinal axis of the link is disposed and vertically toward the link when the rear frame is pivoted relative to the front frame from a first position in which a first longitudinal axis of the front frame is parallel to a second longitudinal axis of the rear frame, to a second position in which the first longitudinal axis of the front frame is not parallel to the second longitudinal axis of the rear frame.

10. The linkage arrangement according to claim 1, wherein the pivot rod of the second pivot joint extends downward and is positioned adjacent to a bottom surface of a top portion of the front frame, and
wherein the pivot rod of the third pivot joint extends upward and is positioned adjacent to a top surface of the rear frame.

11. The linkage arrangement according to claim 1, wherein a first pivot rod of the first pivot joint extends vertically in the same direction as the second pivot rod.

12. An articulated lawn mower comprising:
a front frame having a first longitudinal axis;
a rear frame having a second longitudinal axis; and
an articulated joint including:
a first pivot joint interconnecting the front frame and the rear frame such that the front frame and the rear frame are pivotable relative to each other about the first pivot joint, and
a link having a fixed length,
wherein the link has a front end pivotably connected to the front frame via a second pivot joint, and a rear end pivotably connected to the rear frame via a third pivot joint,
wherein a projection of a vertical axis of the first pivot joint on the link in a neutral position is positioned between the second and third pivot joints, at a first distance from the second pivot joint and at a second distance from the third pivot joint,
wherein the first pivot joint is configured to enable movement in a lateral direction and a vertical direction responsive to pivoting of the rear frame relative to the front frame out of the neutral position,
wherein a pivot rod of the second pivot joint extends vertically in a first direction and a pivot rod of the third pivot joint extends vertically in a second direction which is opposite the first direction,
wherein the front frame has a first wheel axle and the rear frame has a second wheel axle, and wherein a third distance between the first pivot joint and the first wheel axle differs from a fourth distance between the first pivot joint and the second wheel axle when the first longitudinal axis is parallel to the second longitudinal axis, and
wherein the third pivot joint is positioned between the first pivot joint and the second wheel axle.

13. The articulated lawn mower according to claim 12, wherein the pivot joints are configured so as to allow pivoting in directions which extend in separate planes.

14. The articulated lawn mower according to claim 12, wherein at least one of the pivot joints is a spherical bearing.

15. The articulated lawn mower according to claim 12, wherein at least one of the pivot joints is a ball joint.

16. The articulated lawn mower according to claim 12, wherein the first distance, and the second distance are equal when the first longitudinal axis is parallel to the second longitudinal axis.

17. The articulated lawn mower according to claim 12, wherein the fourth distance is smaller than the third distance.

18. The articulated lawn mower according to claim 12, wherein the ratio between the third distance and the fourth distance is 3 (three).

19. The articulated lawn mower according to claim 12, wherein the first pivot joint is configured to move both laterally away from a first vertical plane in which a longitudinal axis of the link is disposed and vertically toward the link when the rear frame is pivoted relative to the front frame from a first position in which the first longitudinal axis of the front frame is parallel to the second longitudinal axis of the rear frame, to a second position in which the first longitudinal axis of the front frame is not parallel to the second longitudinal axis of the rear frame.

20. The articulated lawn mower according to claim 12, wherein the pivot rod of the second pivot joint extends downward and is positioned adjacent to a bottom surface of a top portion of the front frame, and wherein the pivot rod of the third pivot joint extends upward and is positioned adjacent to a top surface of the rear frame.

\* \* \* \* \*